United States Patent Office 2,705,715
Patented Apr. 5, 1955

2,705,715

PURINE COMPOUNDS AND METHODS OF PREPARING THE SAME

Bernard R. Baker, Nanuet, N. Y., and Robert E. Schaub, Paramus, N. J., assignors to American Cyanamid Company, New York, N. Y., a corporation of Maine No Drawing. Application October 29, 1952,
Serial No. 317,583

18 Claims. (Cl. 260—252)

This invention relates to a new class of substituted purine compounds and more particularly to 2-substituted-mercapto-6-disubstituted-amino-8-mercaptopurines, salts thereof, and methods of preparing the same.

The new purines of this invention can be represented by the following structural formula:

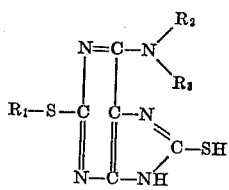

wherein $R_1$—S— represents a substituted mercapto group, or in other words, $R_1$ represents a monovalent organic substituted on the mercapto sulfur, the linkage being by carbon to sulfur bond; and

represents a disubstituted amino group, or in other words, $R_2$ and $R_3$ represent substituents on the amine nitrogen, the linkage, in each instance, being by carbon to nitrogen bond. Suitable substituents which may be represented by $R_1$ in the above formula may be illustrated by alkyl, for instance methyl, ethyl, propyl and butyl; and substituted alkyl radicals, for instance benzyl and substituted benzyl radicals. Compounds of the above formula are of particular interest where $R_2$ and $R_3$ represent members selected from the group including alkyl substituents, aralkyl substituents, mono-cyclic aryl substituents, or when $R_2$ and $R_3$ together represent a divalent substituent whereby the amine nitrogen becomes a member of a heterocyclic ring. For example, $R_2$ and $R_3$ may represent members selected from the group including lower alkyl radicals, as illustrated by methyl, ethyl and propyl; aralkyl radicals, for instance benzyl and substituted benzyl radicals; monocyclic aryl radicals, for instance phenyl and substituted phenyl radicals; or the group

may represent a nitrogen containing heterocyclic ring, for instance a piperidino or morpholino radical. Compounds which at present show the greatest utility are those wherein each of the substituents, $R_1$, $R_2$ and $R_3$, represent saturated hydrocarbon radicals having not more than about ten carbon atoms.

There is evidence to indicate that the new purines of this invention are tautomeric substances and may sometimes exist in a dynamic isomeric state. Such atutomerism can be illustrated by the following equation:

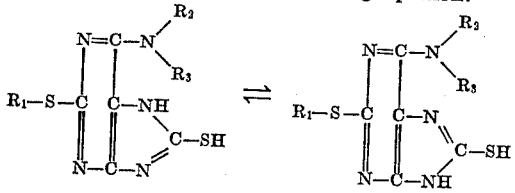

wherein $R_1$, $R_2$ and $R_3$ are as previously defined. It will be understood by those skilled in the art that a tautomeric state can not be illustrated by a single structural formula and therefore in this specification and claims the modern practice in purine chemistry has been followed and the double bond is represented as being between the 7 and 8 positions, even though the compounds may at times exist, at least partially, in an isomeric form.

The new purines of this invention are amphoteric and form salts with both acids and bases. For example the new purine compounds form salts with strong acids as illustrated by hydrochloric acid, sulfuric acid, phosphoric acid and picric acid. Such acid addition salts are of value in the isolation and purification of the new compounds of this invention. As previously stated, the new purine compounds also form salts with bases to give metal derivatives, for example alkaline earth metal, alkali metal and heavy metal derivatives. These metal salts of the new purine compounds, are of value in the field of synthetic chemistry. It is, therefore, intended that both the metal salts and the acid addition salts constitute a part of the present invention.

The new compounds of this invention are useful as intermediates in organic syntheses. For example, the 8-mercapto group can be alkylated and a salt of the resulting di(substituted mercapto) compound reacted with an alkyl halide to give purine compounds having a substituent in the 7 or 9 position. If desired, the mercapto groups can then be removed by reduction. Alternatively, the new compounds of this invention can be employed in the production of purines by the method disclosed in U. S. application S. N. 314,406 filed October 29, 1952, which method comprises treating the mercapto purine compounds with a low temperature-Raney nickel catalyst. Other uses for the new compound of this invention will be apparent to those skilled in the art.

While it is not intended that this invention be limited to purine compounds of the above-described class when prepared by any one particular method, a convenient method of preparing the new class of compounds has been discovered and it is intended that this new method also constitute a part of this invention. According to the new method of this invention, a 2-substituted-mercapto - 4,5 - diamino-6-disubstituted-aminopyrimidine is reacted with carbon disulfide. This new reaction can be illustrated by the following equation:

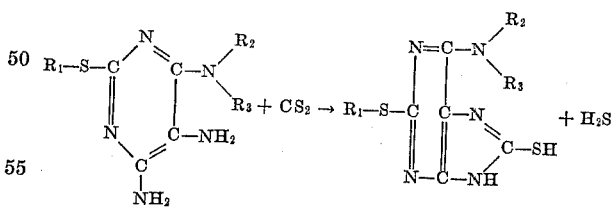

wherein $R_1$, $R_2$, and $R_3$ are as previously defined.

The new reaction is preferably performed in an inert solvent as illustratd by triethylamine or pyridine. Pyridine is the preferred solvent. The reaction may be conducted at any convenient temperature, for instance from about room temperature up to about 130° C., with the preferred reaction temperature being from about 250° C.–100° C. depending upon the particular pyrimidine employed. At room temperature the reaction is substantially complete in from about one to twenty-four hours, and at 100° C. the reaction is substantially complete in from about one-half to one hour.

The invention will be more particularly illustrated by the following specific examples:

*Example I*

A mixture of 12 gm. of 2-methylmercapto-4-amino-6-chloropyrimidine (Am. Chem. J., 34, 182 (1905)) and 30 cc. of 25% aqueous dimethylamine was heated in a steel bomb at 125° C. for four hours. The solid was collected on a filter from the cooled contents and washed with water to yield about 11.8 gm. (94%) of 2-methylmercapto-4-amino-6-dimethylaminopyrimidine having a melting point of about 156° C.–160° C.

To a solution of 25 gm. of 2-methylmercapto-4-amino-6-dimethylaminopyrimidine in 490 cc. of 10% acetic acid cooled to 5° C. was added portionwise with shaking a solution of 11.6 gm. of sodium nitrite in 23 cc. of water. After two hours at 0° C. the mixture was filtered and the blue-green 2-methylmercapto-4-amino-5-nitroso-6-dimethylaminopyrimidine was washed with water.

To a stirred suspension of the preceding wet nitroso compound in 580 cc. of water heated to 50° C. was added 58 gm. of sodium hydrosulfite in portions over a period of five to ten minutes. Ten minutes later an additional 20 gm. of sodium hydrosulfite was added. The temperature was raised to 70° C. for ten minutes. The cooled mixture was filtered and the solid washed with water. Recrystallization of a sample from alcohol gave 2-methyl-mercapto - 4,5 - diamino-6-dimethylaminopyrimidine as white crystals having a melting point of about 154° C.–155° C.

A solution of 1.00 gm. of 2-methylmercapto-4,5-diamino-6-dimethylaminopyrimidine in 10 cc. of pyridine and 2 cc. of carbon disulfide was refluxed on the steam-bath for thirty minutes during which time hydrogen sulfide was evolved and the product crystallized. The cooled mixture was filtered and the solid washed with alcohol to yield about 1.12 gm. (93%) of 2-methylmercapto-6-dimethylamino-8-mercaptopurine as cream colored crystals. This material can be obtained as white crystals by recrystallization from ethylene glycol monomethyl ether. This compound is insoluble in common solvents cold, but is soluble in excess aqueous or alcoholic alkali.

*Example II*

A solution of 3.0 gm. of 2-methylmercapto-4-amino-6-chloropyrimidine and 5.5 cc. of diethylamine in 11 gm. of ethylene glycol monomethyl ether was refluxed for twenty hours, then evaporated to dryness in vacuo. The residue was dissolved in acetone, filtered from diethylamine hydrochloride and the filtrate evaporated to dryness in vacuo to yield about 3.47 gm. (96%) of 2-methylmercapto-4-amino-6-diethylaminopyrimidine as an oil. To a solution of 0.6 gm. of the oil in 10 cc. of 10% acetic acid was added 70 cc. of saturated picric acid. The picrate was collected and washed with water to yield about 1.25 gm. (75%) of a material having a melting point of about 188° C.–190° C. Recrystallization from absolute alcohol gave yellow crystals having a melting point of about 213° C.–215° C.

2 - methylmercapto-4-amino-6-diethylaminopurine was nitrosated, then reduced to 2-methylmercapto-4,5-diamino-6-diethylaminopyrimidine as described in Example I. A solution of 3.7 gm. of this triamine in 37 cc. of pyridine and 7.4 cc. of carbon disulfide was refluxed on the steam-bath for ninety minutes, then evaporated to dryness in vacuo. Trituration of the residue with chloroform gave about 0.77 gm. of 2-methylmercapto-6-diethylamino-8-mercaptopurine having a melting point of about 254° C.–257° C. Recrystallization from ethanol gave white crystals having a melting point of about 264° C.–265° C.

*Example III*

To a solution of 10 gm. of 2-mercapto-4-hydroxy-6-pyrimidol (Ann., 331, 71) in 100 cc. of alcohol and 20 cc. of water containing 2.6 gm. of sodium hydroxide was added 8.1 cc. of benzyl chloride. The mixture was refluxed for fifteen minutes, then cooled. The white crystals of 2-benzylmercapto-4-amino-6-pyrimidol were collected and washed with alcohol. Recrystallization from a mixture of water and ethylene glycol monomethyl ether gave white crystals having a melting point of about 243° C.–243.5° C.

A mixture of 11.3 gm. of 2-benzylmercapto-4-amino-6-hydroxypyrimidine, 3 cc. of dimethylaniline and 57 cc. of phosphorus oxychloride was refluxed for eight hours, then concentrated to a syrup in vacuo and poured into 200 cc. of water. The mixture was warmed on the steam-bath, then made strongly basic with excess 28% ammonia water and heated on the steam-bath for one hour. The mixture was cooled. The solid was collected and washed with water, then triburated with 25 cc. of 1 N sodium hydroxide. The cyrstals of 2-benzylmercapto-4-amino-6-chloropyrimidine were collected and washed with water, then heptane. Recrystallization from heptane gave white needles having a melting point of about 103° C.–104° C.

A mixture of 5.8 gm. of 2-benzylmercapto-4-amino-6-chloropyrimidine, 15.5 gm. of ethylene glycol monomethyl ether and 6 cc. of piperidine was refluxed for four hours, then evaporated to dryness in vacuo. The residue was shaken with 100 cc. each of water and chloroform. The separated, dried organic layer, was evaporated to dryness in vacuo leaving about 5.7 gm. (83%) of 2-benzylmercapto-4-amino-6-piperidinopyrimidine as an oil. This compound was insoluble in water, but soluble in alcohol, chloroform or ethyl acetate. The oil gave a 76% yield of picrate which formed yellow crystals having a melting point of about 194° C.–195° C. from 50% alcohol.

2 - benzylmercapto-4-amino-6-piperidinopyrimidine was converted to 2-benzylmercapto-4,5-diamino-6-piperidinopyrimidine, a yellow oil, as in Example I. A solution of 1.0 gm. of this oil in 10 cc. of pyridine and 2 cc. of carbon disulfide was refluxed for one-half hour, then evaporated to dryness in vacuo. Trituration with alcohol gave about 0.46 gm. of 2-benzylmercapto-6-piperidino-8-mercaptopurine. Recrystallization afforded cream colored crystals having a melting point of about 273° C.–274° C. with decomposition.

*Example IV*

A mixture of 10 gm. of 2-methylmercapto-4-amino-6-chloropyrimidine and 15.5 cc. of methylaniline was heated in a bath at 125° C. for twenty-two hours during which time crystals separated. Trituration of the cooled mixture with acetone gave about 14.1 gm. (87%) of 2-methylmercapto - 4-amino-6-methylanilinopyrimidine hydrochloride. Recrystallization from 25% alcohol afforded white crystals having a melting point of about 253° C.–254° C. This salt is soluble in hot alcohol, but insoluble in water, acetone or benzene.

When an alcoholic solution of the hydrochloride salt was poured into four volumes of dilute base, 2-methylmercapto-4-amino-6-methylanilinopyrimidine base separated as white crystals having a melting point of about 123° C.–125° C. This compound is insoluble in water, but soluble in chloroform or warm alcohol.

2 - methylmercapto - 4 - amino-6-methylanilinopyrimidine was nitrosated and reduced to 2-methylmercapto-4,5-diamino-6-methylanilinopyrimidine as described in Example I. A solution of 1.0 gm. of this triamine in 10 cc. of pyridine and 2 cc. of carbon disulfide was refluxed on the steam-bath for one-half hour, then evaporated to dryness in vacuo. Trituration of the residue with hot ethanol gave about 0.70 gm. of 2-methylmercapto-6-methylanilino-8-mercaptopurine. Recrystallization from ethylene glycol monomethyl ether afforded white crystals having a melting point of about 302° C.–303° C. with decomposition.

*Example V*

A mixture of 10 gm. of 2-methylmercapto-4-amino-6-chloropyrimidine and 23.3 gm. of n-butylbenzylamine was heated at 125° C. for six hours. The partially solid residue was partitioned between ethyl acetate and water. The organic layer was washed several times with 1 N hydrochloric acid, then evaporated to dryness in vacuo. Crystallization of the residue from ethyl acetate-heptane gave about 7.0 gm. (40%) of 2-methylmercapto-4-amino - 6-n-butylbenzylaminopyrimidine. Recrystallization from chloroform-heptane gave white crystals having a melting point of about 149° C–151° C.

2 - methylmercapto - 4 - amino-6-n-butylbenzylaminopyrimidine hydrochloride was nitrosated and reduced to 2 - methylmercapto - 4,5 - diamino-6-n-butylbenzylaminopyrimidine as described in Example I. A solution of 1.1 gm. of this triamine in 11 cc. of pyridine and 2 cc. of carbon disulfide was allowed to stand for twenty-four hours. Part of the solvent was removed in vacuo and the solution was poured into several volumes of about 0.5 N sodium hydroxide. The solution was clarified by filtration through Celite, then Norit. The filtrate was acidified with acetic acid and the crude solid collected. Recrystallization from chloroformheptane gave white crystals of 2-methylmercapto-6-n-butylbenzylamino-8-mercaptopurine having a melting point of about 199° C.–201° C.

Other 2-substituted-mercapto-6-disubstituted-amino-8- mercaptopurines are prepared by the same procedures as illustrated in the above examples.

We claim:
1. The new compound 2-benzylmercapto-6-piperidino-8-mercaptopurine.
2. The 2-lower-alkylmercapto-6-di-lower-alkylamino-8-mercaptopurines.
3. The new compound 2-methylmercapto-6-di-lower-alkylamino-8-mercaptopurine.
4. The new compound 2-methylmercapto-6-diethylamino-8-mercaptopurine.
5. The 2-lower-alkylmercapto-6-lower-alkyl-lower-mononuclear-aralkylamino-8-mercaptopurines.
6. The new compound 2-methylmercapto-6-n-butylbenzylamino-8-mercaptopurine.
7. The 2-lower-alkylmercapto-6-lower-alkyl-lower-mononuclear-arylamino-8-mercaptopurines.
8. The new compound 2-methylmercapto-6-methylanilino-8-mercaptopurine.
9. The method which comprises contacting with carbon disulfide a 2-lower-alkylmercapto-4,5-diamino-6-di-lower-alkylaminopyrimidine, said contact being effected in a pyridine solvent at a temperature of from about 25° C.–100° C.
10. The method of claim 9 when said 2-lower-alkyl-mercapto-4,5-diamino-6-di-lower-alkylaminopyrimidine is 2-methylmercapto-4,5-diamino-6-dimethylaminopyrimidine.
11. The method of claim 9 when said 2-lower-alkyl-mercapto-4,5-diamino-6-di-lower-alkylaminopyrimidine is 2-methylmercapto-4,5-diamino-6-diethylaminopurine.
12. The method which comprises contacting with carbon disulfide a 2-lower-alkylmercapto-4,5-diamino-6-lower-alkyl-lower-mononuclear-aralkylaminopyrimidine, said contact being effected in a pyridine solvent at a temperature of from about 25° C–100° C.
13. The method of claim 12 when said 2-lower-alkyl-mercapto-4,5-diamino-6-lower-alkyl-lower-mononuclear-aralkylaminopyrimidine is 2-methylmercapto-4,5-diamino-6-n-butylbenzylaminopyrimidine.
14. The method which comprises contacting with carbon disulfide a 2-lower-alkylmercapto-4,5-diamino-6-lower-alkyl-lower-mononuclear-arylaminopyrimidine, said contact being effected in a pyridine solvent at a temperature of from about 25° C.–100° C.
15. The method of claim 14 when said 2-lower-alkyl-mercapto-4,5-diamino-6-lower-alkyl-lower-mononuclear-arylaminopyrimidine is 2-methylmercapto-4,5-diamino-6-methylanilinopyrimidine.
16. The method which comprises contacting with carbon disulfide 2-benzylmercapto-4,5-diamino-6-piperidinopyrimidine, said contact being effected in a pyridine solvent at a temperature of from 25–100° C.
17. Compounds having the general formula:

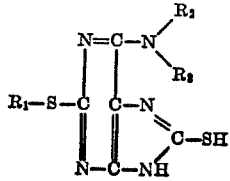

wherein $R_1$ is a member selected from the group consisting of lower-alkyl and lower-mononuclear-aralkyl radicals and

is a member of the group consisting of di-lower-alkylamino, di-mononuclear-arylamino, mononuclear-aryl-lower-alkylamino, di-lower-mononuclear-aralkylamino, mononuclear-aryl-lower-mononuclear-aralkylamino, lower-alkyl-lower-mononuclear-aralkylamino and piperidino radicals.

18. A method for preparing compounds having the general formula

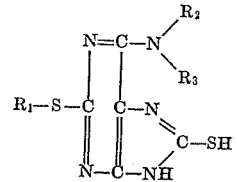

wherein $R_1$ is a member selected from the group consisting of lower-alkyl and lower-mononuclear-aralkyl radicals and

is a member of the group consisting of di-lower-alkylamino, di-mononuclear-arylamino, mononuclear-aryl-lower-alkylamino, di-lower-mononuclear-aralkylamino, mononuclear-aryl-lower-mononuclear-aralkylamino, lower-alkyl-lower-mononuclear-aralkylamino and piperidino radicals which comprises contacting with carbon disulfide, a compound having the general formula

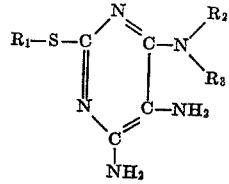

said contact being effected in an inert solvent.

No references cited.